(12) United States Patent
Doubek et al.

(10) Patent No.: US 12,313,875 B2
(45) Date of Patent: *May 27, 2025

(54) UNDERCABINET LIGHTING DEVICES AND METHODS FOR INSTALLING THE SAME

(71) Applicant: Dado Lighting, LLC, Indian Head Park, IL (US)

(72) Inventors: David E. Doubek, Indian Head Park, IL (US); Mladen Suleski, Indian Head Park, IL (US)

(73) Assignee: Dado Lighting, LLC, Indian Head Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,343

(22) Filed: Feb. 20, 2024

(65) Prior Publication Data

US 2024/0192435 A1    Jun. 13, 2024

Related U.S. Application Data

(63) Continuation of application No. 18/157,640, filed on Jan. 20, 2023, now Pat. No. 11,927,797.

(60) Provisional application No. 63/302,901, filed on Jan. 25, 2022.

(51) Int. Cl.
*F21V 8/00*    (2006.01)

(52) U.S. Cl.
CPC ........... *G02B 6/0088* (2013.01); *G02B 6/005* (2013.01); *G02B 6/0073* (2013.01)

(58) Field of Classification Search
CPC ..... G02B 6/0088; G02B 6/005; G02B 6/0073
See application file for complete search history.

(56) References Cited

U.S. PATENT DOCUMENTS

| | | | | |
|---|---|---|---|---|
| 2008/0310158 A1* | 12/2008 | Harbers | ............... | G02B 6/0078 |
| | | | | 362/240 |
| 2023/0250929 A1* | 8/2023 | Doubek | ............... | G02B 6/0085 |
| | | | | 362/633 |

OTHER PUBLICATIONS

Moore et al., WO 2014/172147, Oct. 2014 (Year: 2014).*

* cited by examiner

*Primary Examiner* — Mary Ellen Bowman
(74) *Attorney, Agent, or Firm* — Nixon Peabody LLP

(57) ABSTRACT

A lighting device includes a housing, a light source, a light guide panel, and a lens. The housing includes a base, a first side wall, a second side wall, a first bumper protruding from an outer surface of the first side wall, and a second bumper protruding from an outer surface of the second side wall. The first bumper and second bumper to aid in positioning the housing within a slot formed in an external structure. The light guide panel is configured to diffuse light emitted by the light source. The lens is coupled to the housing and includes a base, a first side wall, a second side wall, a first wing protruding from an inner surface of the first side wall, and a second wing protruding from an inner surface of the second side wall.

15 Claims, 11 Drawing Sheets

UNDERCABINET LIGHTING DEVICES AND METHODS FOR INSTALLING THE SAME

CROSS REFERENCE TO RELATED APPLICATIONS

This application is a continuation of U.S. application Ser. No. 18/157,640, filed Jan. 20, 2023, now allowed, which claims the benefit of, and priority to, U.S. Provisional Application No. 63/302,901, filed Jan. 25, 2022, each of which is hereby incorporated by reference herein in its entirety.

TECHNICAL FIELD

The present disclosure relates generally to lighting devices, and more particularly, to lighting devices configured to be positioned within a slot formed in an external structure (e.g., a cabinet), and methods for installing the same.

BACKGROUND

Cabinets and other fixtures, furniture, or structures (e.g., wood slat walls) often include integrating lighting (e.g., under cabinet lighting to illuminate a surface or area underneath). Many of these integrated lights are installed in the structure (e.g., cabinet) while is being manufactured or assembled (e.g., before the cabinet has been shipped and installed). In some applications, it is desirable to at least partially construct or assemble the structure in the field (e.g., where it is to be installed) and/or install the lighting device in the field. However, such field constructions have a wider range of tolerances than if the structure were constructed or assembled beforehand (e.g., when forming a slot for receiving the lighting device), and variations in these tolerances can make it difficult to install a lighting device having a fixed width and/or length. Further, field installations of lighting devices often require the installer to additionally install trim or flanges that match the cabinet color and/or finish to cover gaps and/or edges of the lighting device to avoid the housing of the lighting device (e.g., a metal heat sink) from being visible. The present disclosure is directed to solving these and other problems.

SUMMARY

According to some implementations of the present disclosure, a lighting device includes a housing, a light source, a light guide panel, and a lens. The housing includes a base, a first side wall, a second side wall, a first bumper protruding from an outer surface of the first side wall, and a second bumper protruding from an outer surface of the second side wall. The first bumper and second bumper are configured to aid in positioning the housing within a slot formed in an external structure. The light source is coupled to the housing. The light guide panel is coupled to the housing and configured to diffuse light emitted by the light source. The lens includes a base, a first side wall, a second side wall, a first wing protruding from an inner surface of the first side wall, and a second wing protruding from an inner surface of the second side wall. The lens is coupled to the housing such that a portion of the first side wall of the housing and a portion of the second side wall of the housing are positioned between the first side wall of the lens and the second side wall of the lens.

According to some implementations of the present disclosure, a lighting device includes a housing, a light source, a light guide panel, and a lens. The housing includes a pair of bumpers configured to aid in positioning the housing in a slot formed in an external structure. The light source is coupled to the housing. The light guide panel is coupled to the housing and configured to diffuse light emitted by the light source. The lens includes a pair of wings configured to aid in distributing light, the lens being coupled to the housing such that a portion of the housing is disposed within an internal cavity of the lens.

According to some implementations of the present disclosure, a system includes a plurality of lighting devices. Each of the plurality of lighting devices includes a housing including a pair of bumpers configured to aid in positioning the housing in a slot formed in an external structure, a light source coupled to the housing, a light guide panel coupled to the housing and configured to diffuse light emitted by the light source, and a lens including a pair of wings configured to aid in distributing light, the lens being coupled to the housing such that a portion of the housing is disposed within an internal cavity of the lens.

According to some implementations of the present disclosure, a method includes positioning a housing of a lighting device within a slot formed in an external structure, the housing including a light source coupled thereto. The method also includes coupling the housing of the lighting device to a mounting surface within the slot via one or more fasteners. The method also includes coupling a light guide panel to the housing subsequent to coupling the housing to the mounting surface. The method also includes coupling a lens to the housing subsequent to coupling the light guide panel to the housing.

The above summary is not intended to represent each implementation or every aspect of the present disclosure. Additional features and benefits of the present disclosure are apparent from the detailed description and figures set forth below.

Figure 1A:
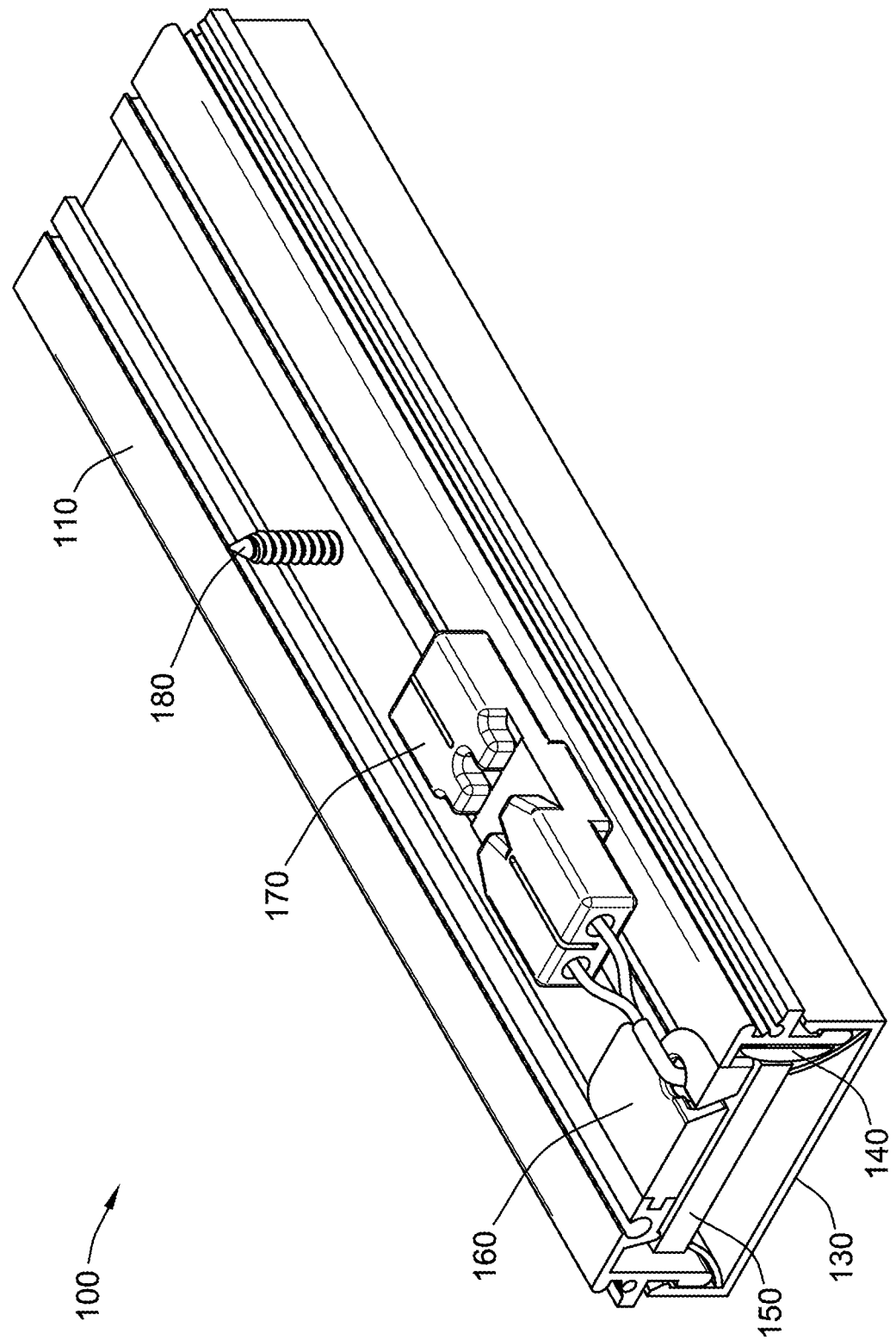
FIG. 1A is an assembled perspective view of a lighting device, according to some implementations of the present disclosure.

While the present disclosure is susceptible to various modifications and alternative forms, specific implementations and embodiments thereof have been shown by way of example in the drawings and will herein be described in detail. It should be understood, however, that it is not intended to limit the present disclosure to the particular forms disclosed, but on the contrary, the present disclosure is to cover all modifications, equivalents, and alternatives falling within the spirit and scope of the present disclosure as defined by the appended claims.

DETAILED DESCRIPTION

Figure 1B:
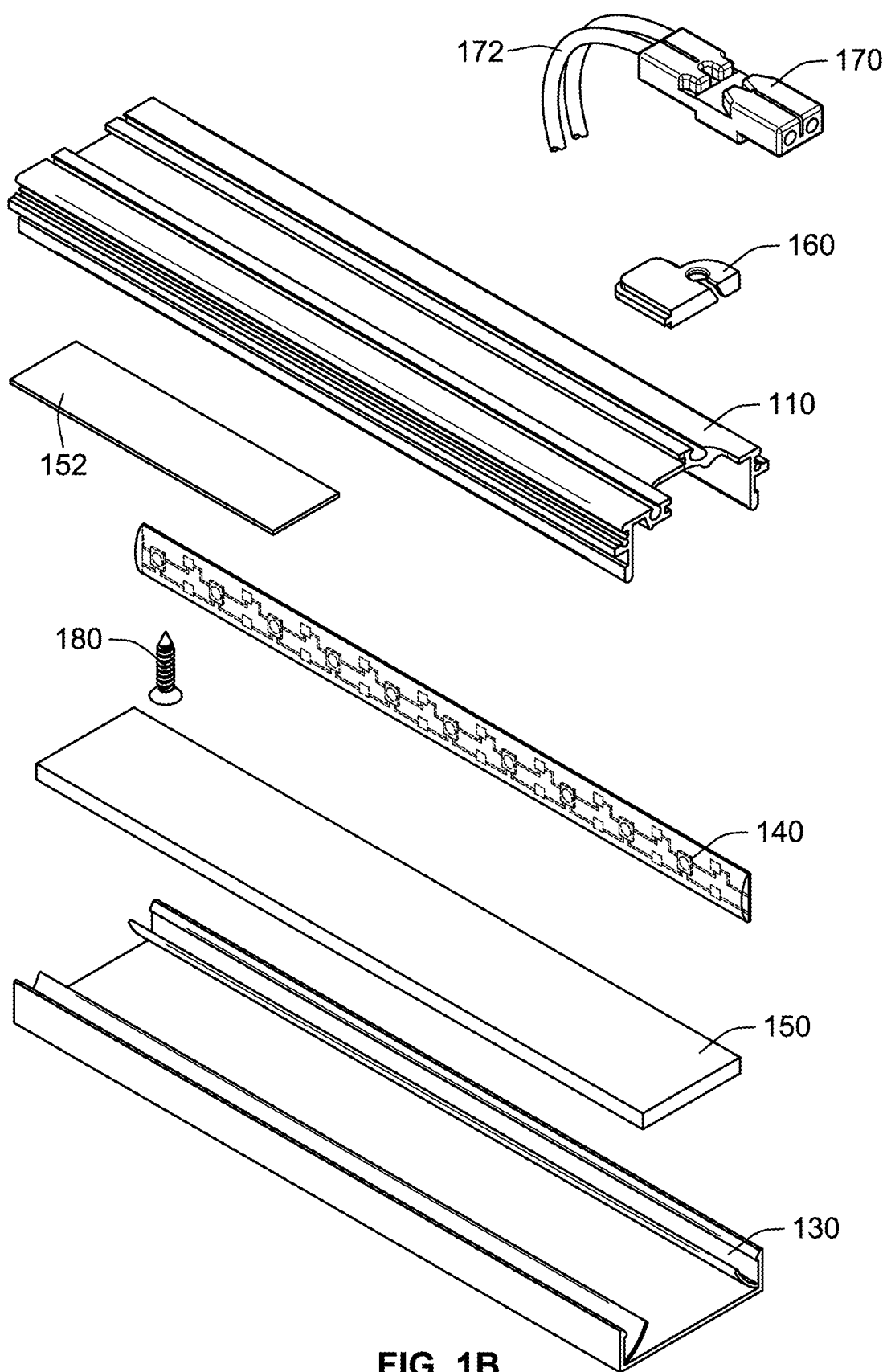
FIG. 1B is an exploded perspective view of the lighting device of FIG. 1A, according to some implementations of the present disclosure.

Referring to FIGS. 1A and 1B, a lighting device 100 according to some implementations of the present disclosure is illustrated. The lighting device 100 includes a housing 110, a lens 130, a light source 140, a light guide panel 150, a wiring guide 160, a power connector 170, and a fastener 180. As described herein, the lighting device 100 can be mounted with a slot formed in an external structure (e.g., a cabinet or other furniture) such that the lens 130 is generally flush with a finished surface of the external structure.

Figure 2A:
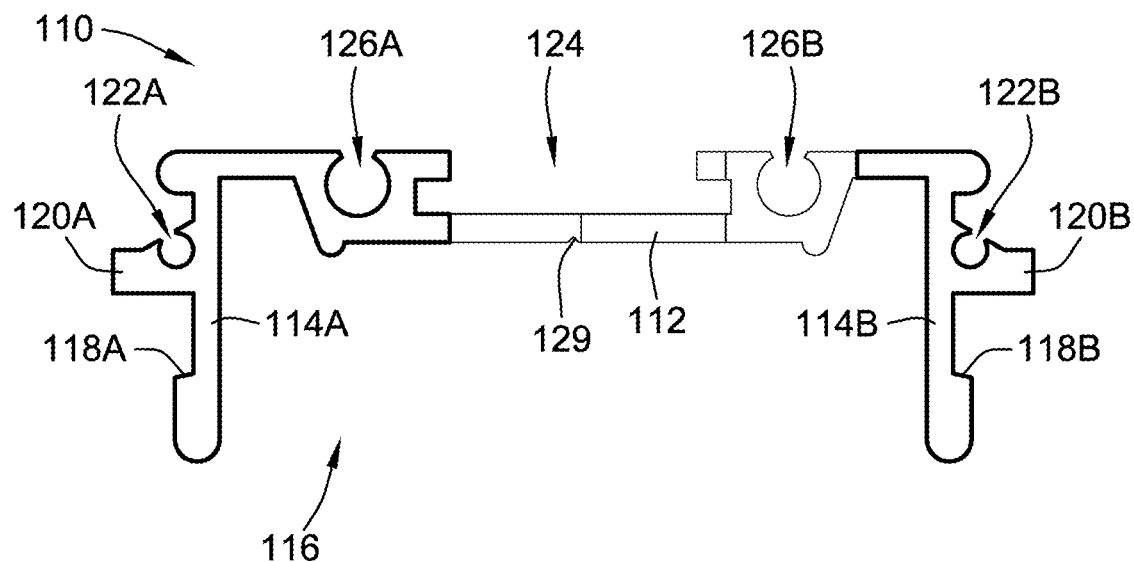
FIG. 2A is a cross-sectional view of a housing of the lighting device of FIG. 1A, according to some implementations of the present disclosure.
Figure 2B:
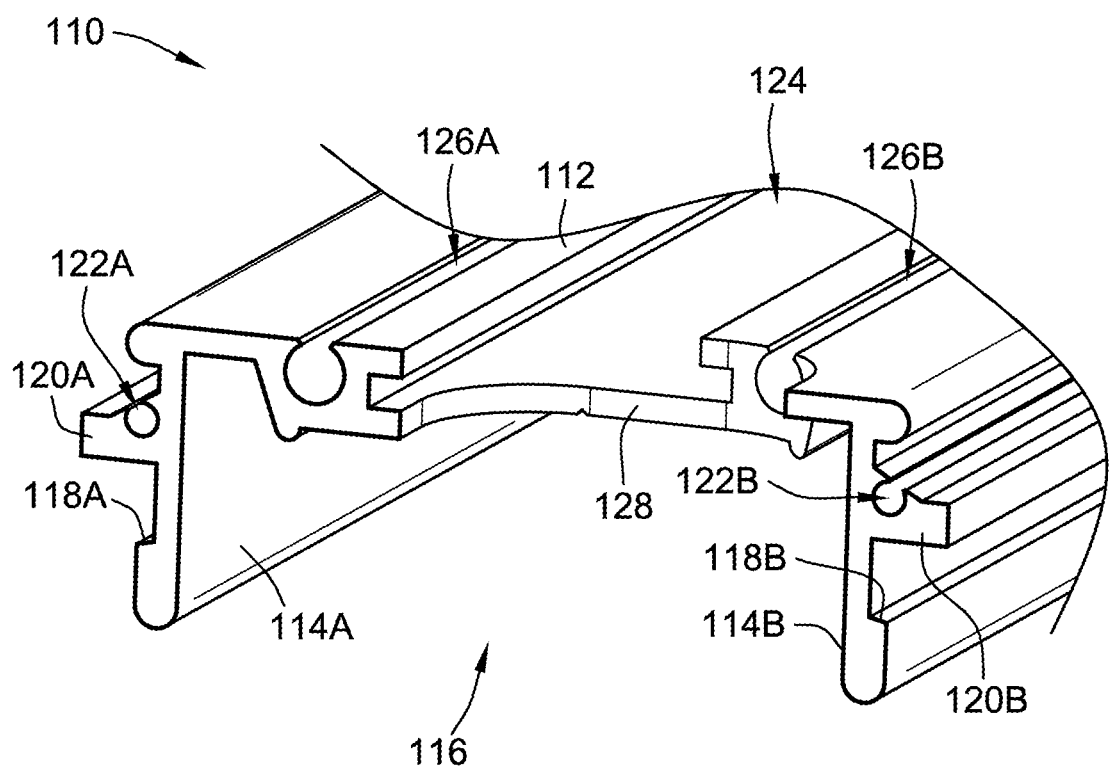
FIG. 2B is a partial perspective view of the housing of the lighting device, according to some implementations of the present disclosure.

Referring to FIGS. 2A and 2B, the housing 110 includes a base 112, a first side wall 114A, and a second side wall 114B. The first side wall 114A and the second side wall 114B generally extend from the base 112 and define an internal cavity 116 of the housing 110. The housing 110 also includes a first bumper 120A extending from an outer surface of the first side wall 114A and a second bumper 120B extending from an outer surface of the second side wall 114B. The first side wall 114A also includes a first ridge 118A on the outer surface thereof that extends along the length of the first side wall 114A. The second side wall 114B includes a second ridge 118B that is the same as, or similar to, the first ridge 118A. As described herein, the first ridge 118A and the second ridge 118B engage a portion of the lens 130 to aid in coupling the lens 130 to the housing 110 (e.g., by a snap fit coupling).

Generally, the first bumper 120A and the second bumper 120B are moveable or deflectable relative to the first side wall 114A and the second side wall 114B, respectively, to aid in positioning the housing 110 within an opening during installation of the lighting device 100. The first bumper 120A and the second bumper 120B can extend along a least a portion of the length of the housing 110 (e.g., along the entire length of the housing 110). The first bumper 120A includes a first slot 122A formed therein. The first slot 122A and the second slot 122B each have a generally circular or semi-circular cross-section and extend along the length of the first bumper 120A and the second bumper 120B, respectively.

The first slot 122A and the second slot 122B can be used for a variety of purposes. For example, in some implementations, the lighting device 100 can be coupled to another lighting device (e.g., that is the same as, or similar to, the lighting device 100) via alignment pins that are partially received within the first slot 122A and the second slot 122B (e.g., forming a press or interference fit). These alignment pins aid in coupling the lighting device 100 to the other lighting device and to align the two lighting devices. In other implementations, the lighting device 100 can include an end cap at either end of the housing 110. The end cap can comprise the same material as the lens 130 to allow light to pass through. The end cap can be coupled to the housing via one or more fasteners (e.g., screws) that are received within the first slot 122A and the second slot 122B.

The housing 110 also includes a groove 124, a first slot 126A, and a second slot 126B formed in an upper surface of the base 112. The groove 124, the first slot 126A, and/or the second slot 126B generally extend along the length of the housing 110 (e.g., the entire length of the housing 110). Like the first slot 122A in the first bumper 120A and the second slot 122B in the second bumper 120B, the first slot 126A and the second slot 126B have a generally circular or semi-circular cross-section and aid in permitting movement or deflection of the first side wall 114A and/or the second side wall 114B, respectively, relative to the base 112. This movement or deflection of the first side wall 114A and/or second side wall 114B further aids in positioning the housing 110 within an opening during installation of the lighting device 100.

Figure 8A:
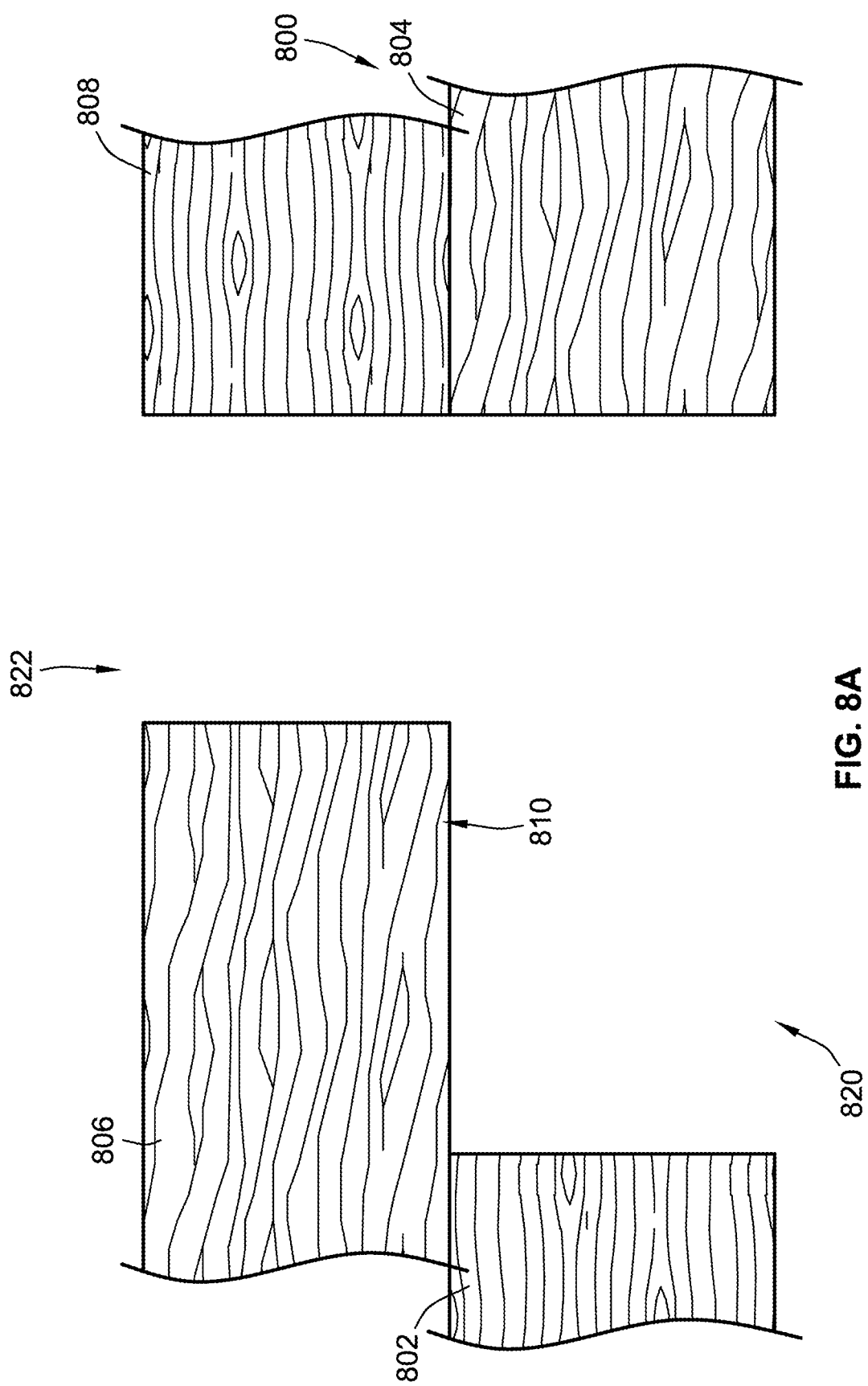
FIG. 8A is a cross-sectional view of an external surface, according to some implementations of the present disclosure.
Figure 8B:
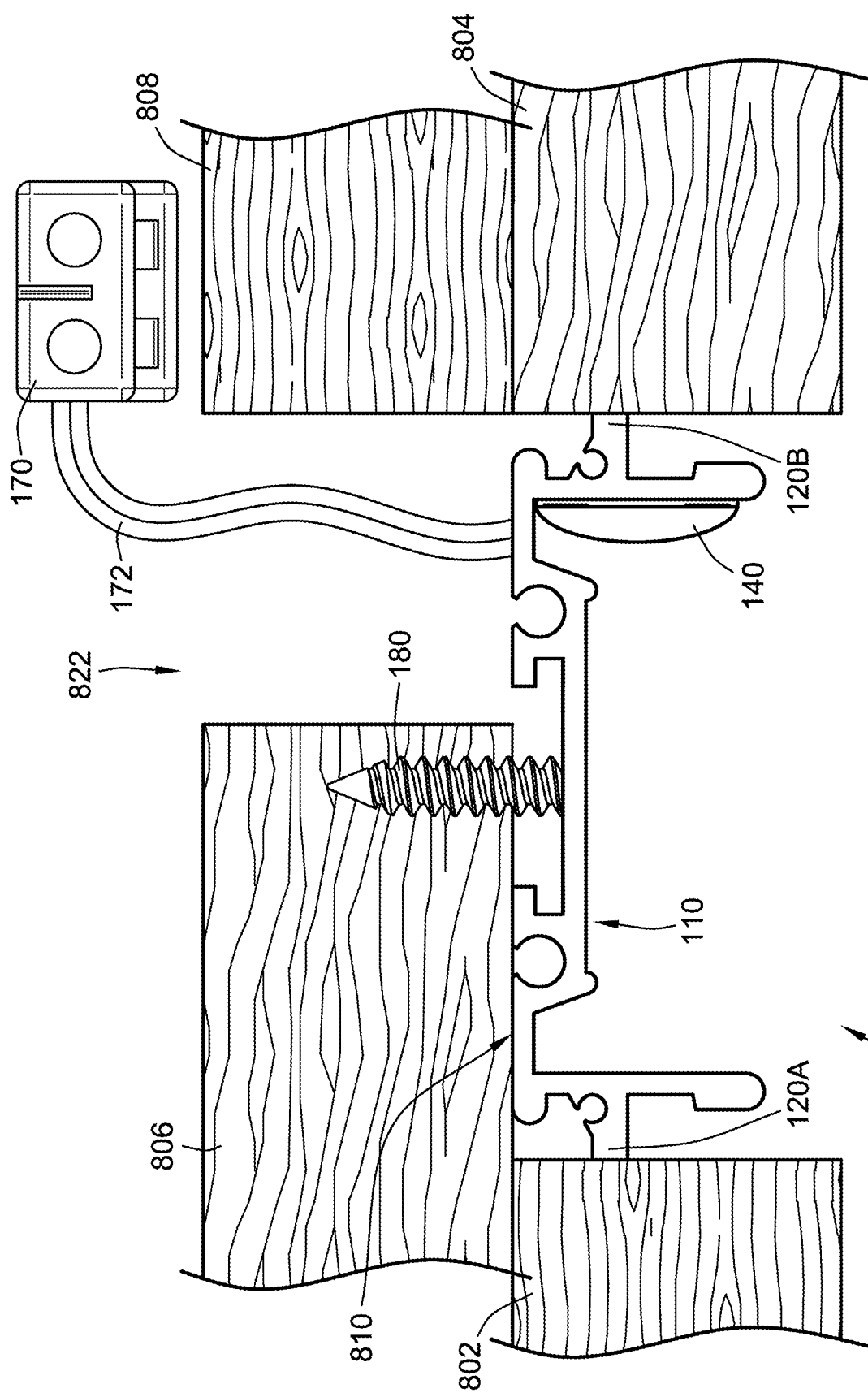
FIG. 8B is a cross-sectional view of the external surface and a lighting device including a housing and a light source, according to some implementations of the present disclosure.
Figure 8C:
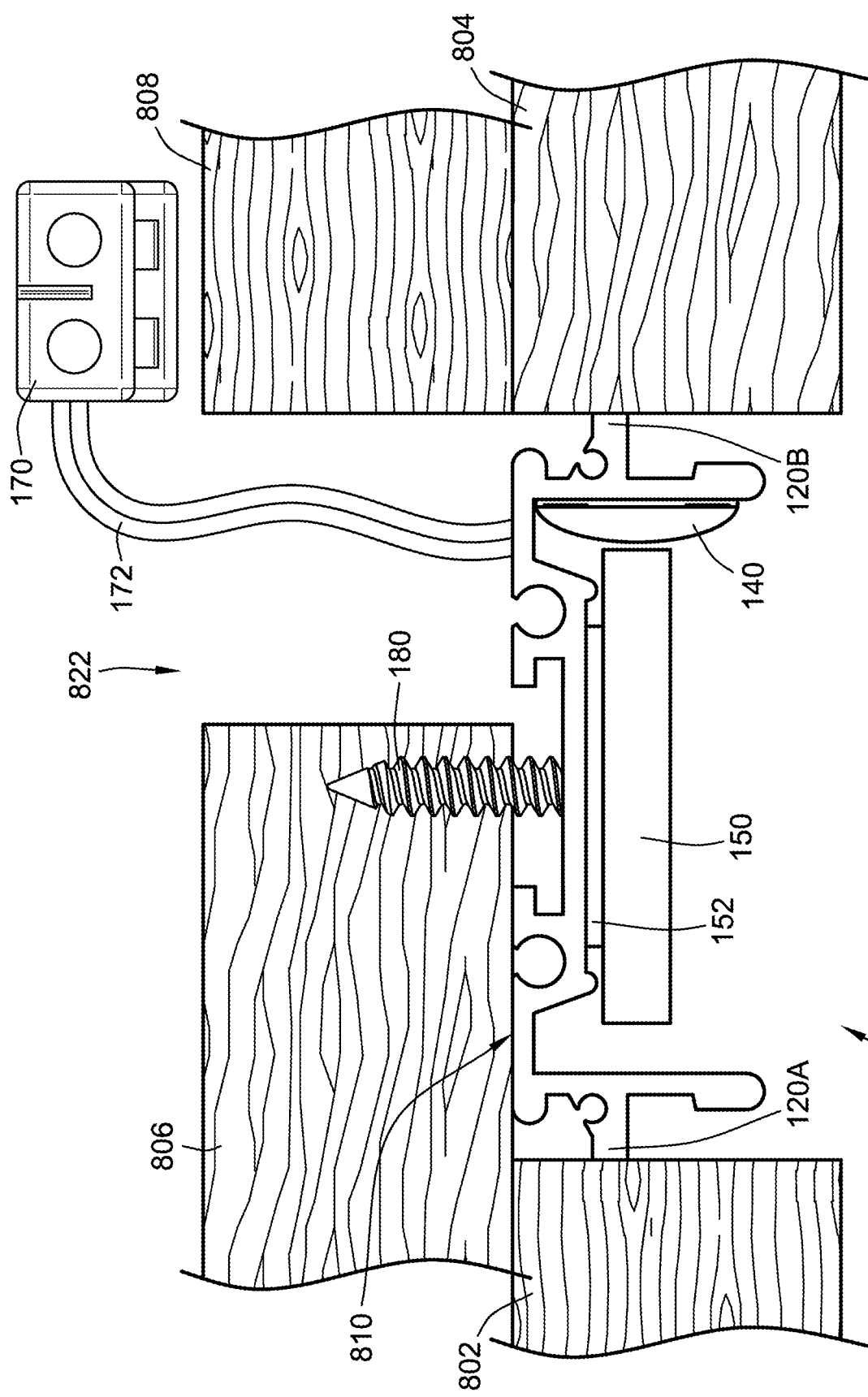
FIG. 8C is a cross-sectional view of the external surface and the lighting device of FIG. 8B further including a light guide panel, according to some implementations of the present disclosure.
Figure 8D:
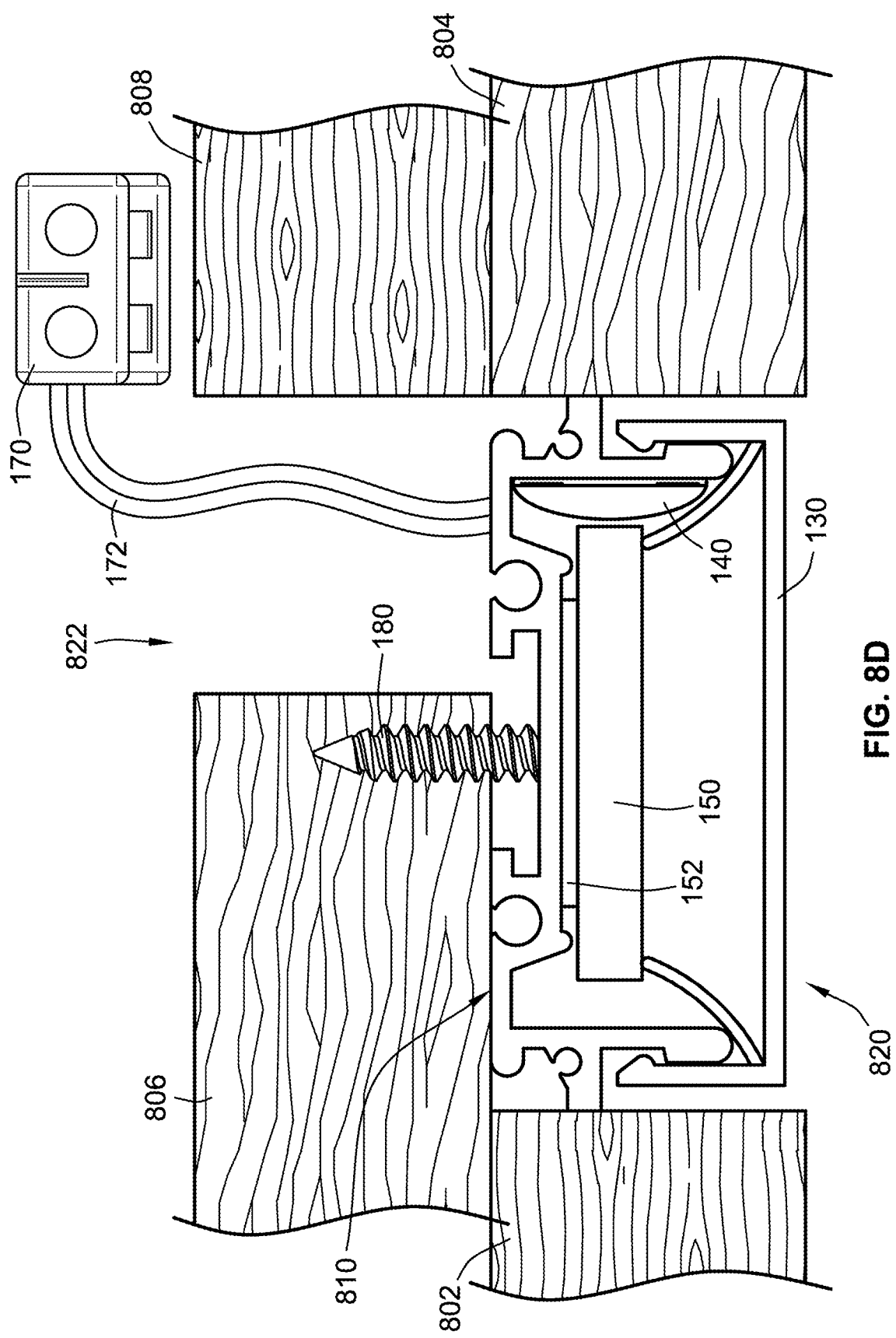
FIG. 8D is a cross-sectional view of the external surface and the lighting device of FIG. 8C further including a lens, according to some implementations of the present disclosure.

In some implementations, the groove 124 can receive one or more coupling or attachment mechanisms therein to aid in coupling the lighting device 100 to an external structure (e.g., as shown in FIGS. 8B-8D) and/or to another lighting device (e.g., that is the same as, or similar to, the lighting device 100). For example, the lighting device 100 can include an alignment plate or tab that includes a first portion configured to be received within the groove 124 and a second portion configured to be received within the tongue of another lighting device. The alignment plate or tab forms a press or interference fit within the respective tongues to aid in coupling the lighting devices together, and also aids in aligning the two lighting devices. The alignment plate or tab can have any suitable shape to facilitate arranging the two lighting devices, for example, regardless of whether the two lighting devices are arranged with parallel longitudinal axes or at an angle relative to one another (e.g., to form a miter joint or corner). While the lighting device 100 is described herein as being coupled to an external structure using the fastener 180 (e.g., as shown in FIGS. 8B-8D), in other implementations, the lighting device 100 can be coupled to the external structure using one or more clips (e.g., a spring clip with arms), one more brackets, one or more magnets, or any combination thereof that are received within the groove 124.

In some implementations, the housing 110 further includes a cutout 128 (FIG. 2B) formed in an end of the base 112 within the groove 124. As described herein, the cutout 128 is sized and shaped to receive a portion of the wiring guide 160 therein to aid in coupling the wiring guide 160 to the housing 110 (e.g., as shown in FIG. 1A). In some implementations, the housing 110 also includes a scribed line 129 extending along a lower surface of the base 112. The scribed line 129 is a notch or channel along the center longitudinal axis of the housing 110 that aids in drilling one or more aperture in the base 112 of the housing 110 so that the housing 110 can be mounted to a surface using one or more fasteners.

The housing 110 comprises a material (e.g., aluminum, steel, stainless steel, etc.) that aids in absorbing and/or distributing heat generated by the light source 140 so that the housing 110 acts a heat sink. As shown, the housing 110 is a unitary and/or monolithic component. In other implementations, the housing 110 can comprise one or more components that are coupled (e.g., welded) together. In some implementations, the housing 110 has a width (measured from the outer edges of the first bumper 120A and the second bumper 120B) of about 1.75 inches.

Figure 3:
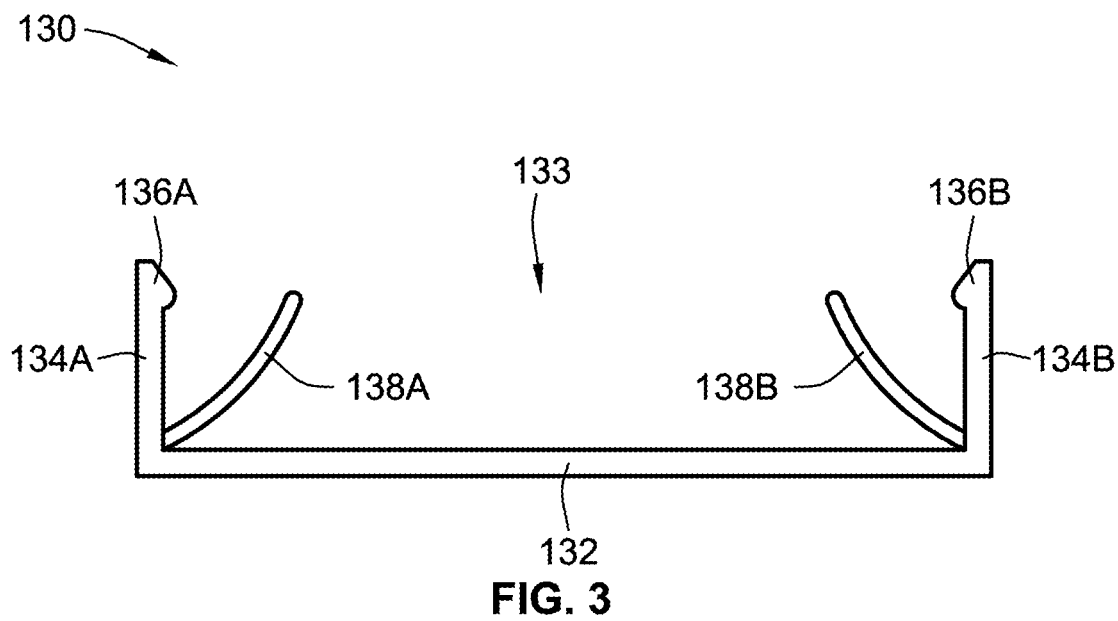
FIG. 3 is an end view of a lens of the lighting device of FIG. 1A, according to some implementations of the present disclosure.

Referring to FIG. 3, the lens 130 includes a base 132, a first side wall 134A, and a second side wall 134B. The first side wall 134A and the second side wall 134B extend from the base 132 to define an interior cavity 133 of the lens 130. The first side wall 134A includes a first hook 136A and the second side wall 134B includes a second hook 136B. As described herein, the first hook 136A and the second hook 136B aid in coupling the lens 130 to the housing 110 (e.g., via a snap fit coupling). The lens 130 also includes a first wing 138A extending from the first side wall 134A and a second wing 138B extending from the second side wall 134B. More specifically, the first wing 138A extends from an area at or adjacent to the intersection between the first side wall 134A and the base 132. The first wing 138A and the second wing 138B generally have a curved shaped and extend along the length of the lens 130 (e.g., the entire length of the lens 130).

The lens 130 generally comprises a material (e.g., a polymer) for allowing light to pass through so that light emitted from a light source in the internal cavity 133 is emitted outside of the lens 130. The lens 130 can comprise a generally flexible material that permits deflection of the first side wall 136A and/or the second side wall 136B to aid in forming a snap fit coupling between the lens 130 and the housing 110. In some implementations, the lens 130 includes a frosted surface or material (e.g., a material that is roughened, textured, or patterned) to aid in diffusing light in all directions. In some implementations, the lens 130 has a width of about 1.625 inches and a length of about 100 inches.

Figure 4:
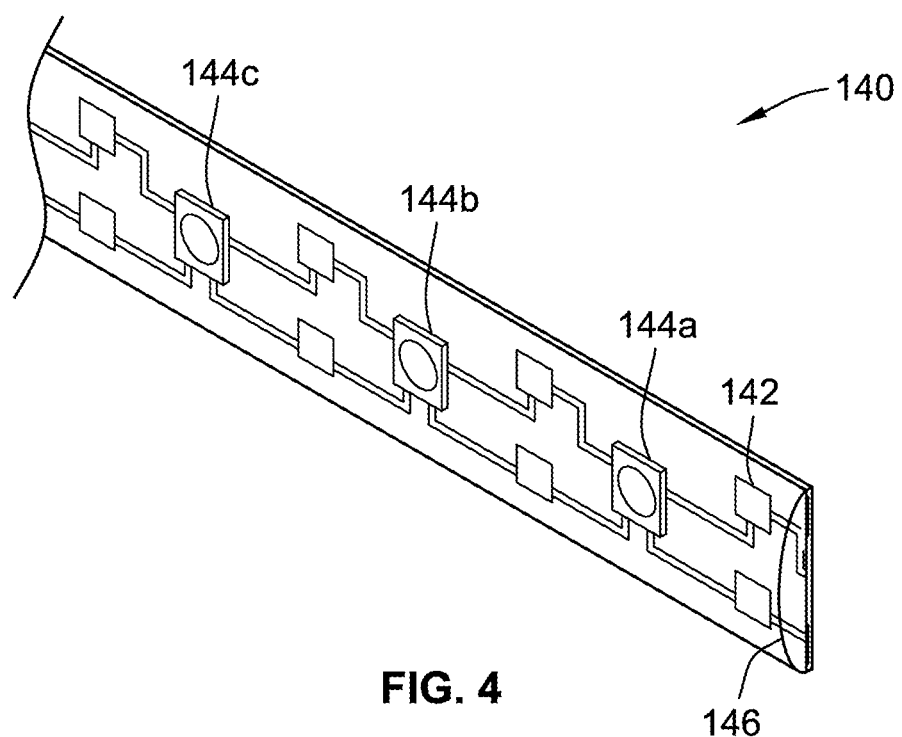
FIG. 4 is a partial perspective view of a light source of the lighting device of FIG. 1, according to some implementations of the present disclosure.

Referring to FIG. 4, the light source 140 includes a support substrate 142 and a plurality of light emitting diodes (LEDs) 144a-c coupled to the support substrate 142. The light source 140 also includes an encapsulant 146 (e.g., comprising silicon) that at least partially surrounds the plurality of LEDs 144a-c. The support substrate 142 can be a rigid board or plate, a flexible strip or film, a printed circuit board, etc. The plurality of LEDs 144a-c can include white LEDs, blue LEDs (e.g., III-nitride LEDs), red LEDs, green LEDs, yellow LEDs, amber LEDs, orange LEDs, infrared LEDs, ultraviolet LEDs, or any combination thereof. The plurality of LEDs 144a-c can be dimmable (e.g., together or individually controllable). The plurality of LEDs 144a-c can be mounted to the support substrate 142 using any suitable packaging technique (e.g., a surface mount package, a through-pin package, etc.). Further, the plurality of LEDs 144a-c can be electrically coupled to one another using any suitable mechanism or technique (e.g., in series, in parallel, via wiring, via traces, etc.). The encapsulant 146 protects the plurality of LEDs 144a-c (e.g., from mechanical damage) and/or modifies the light emission characteristics. For example, the encapsulant 146 can include a wavelength converter (e.g., a phosphor material) that converts a first wavelength of light emitted by the LEDs 144a-c (e.g., blue) to a second wavelength of light (e.g., white), which is then emitted from encapsulant 146.

Figure 5:
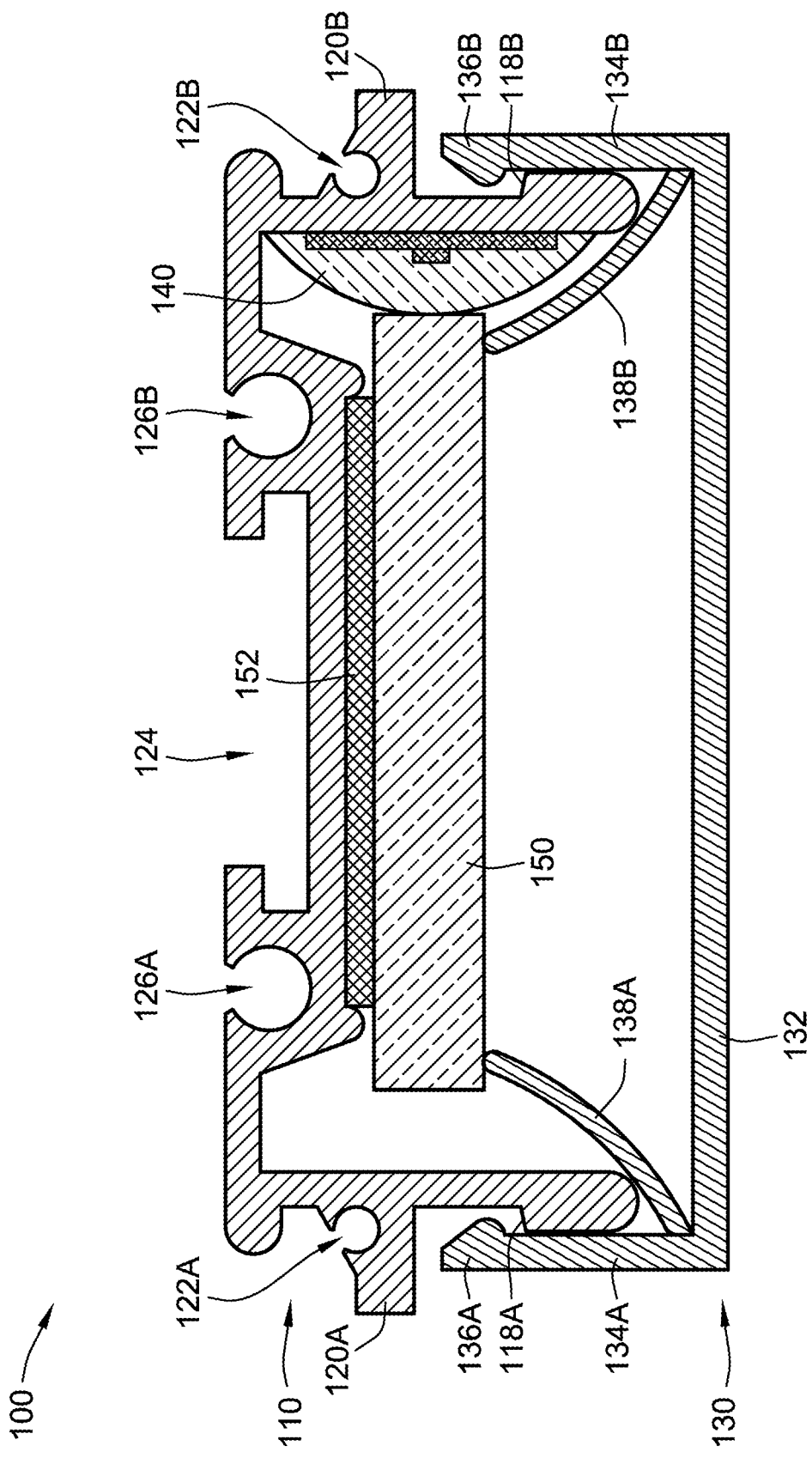
FIG. 5 is a cross-sectional view of the lighting device of FIG. 1A, according to some implementations of the present disclosure.

Referring to FIG. 5, the light guide panel 150 is coupled to the base 112 of the housing 110 via an adhesive strip 152. The light guide panel 150 generally aids in diffusing light emitted by the light source 140. In some implementations, the light guide panel 150 comprises an acrylic material that aids in diffusing light across substantially the entire length and width of the light guide panel 150. The light guide panel 150 has a generally rectangular profile and extends along substantially the entire length of the housing 110 and/or the light source 140. The light guide panel 150 does not include any fasteners (e.g., screws) that couple to the housing 110 because such fasteners would cause dark spots where light would not be emitted from the light guide panel. To aid in avoiding such dark spots, the light guide panel 150 is coupled to the housing 110 via the adhesive strip 152. In some implementations, a first side of the light guide panel 150 includes a laminate or film that further aids in extracting and diffusing light from the light guide panel 150. In such implementations including the laminate/film, the light guide panel 150 has a width that is about 1.75 inches or less. The film can be a matte polyester film coated with a pressure sensitive acrylic adhesive and a release liner backing. In one non-limiting example, the film on the light guide panel 150 can be a FLEXcon COMPUcall II® PM 100 C MTC-329 L-23 58PW-8 film.

While the lighting device 100 is shown as including one adhesive strip 152, the lighting device 100 can include a plurality of adhesive strips for coupling the light guide panel 150 to the housing 110. For example, the lighting device 100 can include a plurality of adhesive strips having a length between about 3 inches and about 4 inches positioned about every 12 inches along the length of the light guide panel 150. In some implementations, the light guide panel 150 includes a first edge that is clear and a second opposing edge that includes reflective (e.g., silver or white) tape. The reflective tape prevents light from escaping the second edge of the light guide panel and reflects the light back towards the first edge, thereby increasing light diffusion and extraction out of the light guide panel 150.

The adhesive strip 152 is a double-sided adhesive that adheres to both the housing 110 and the light guide panel 150. In some implementations, the adhesive strip 152 can have a width of about 0.75 inches and a length of about 3 inches. In some cases, heat generated by the light guide panel 150 may cause degradation of the adhesive strip 152 (e.g., reducing its holding power). Thus, the adhesive strip 152 preferably has a heat resistance rating of about 120 degrees Fahrenheit. To secure the light guide panel 150 the housing 110, the adhesive strip 152 can have a peel adhesion that is between about 35 oz/in (N/100 mm) and about 70 oz/in (N/100 mm). The adhesive strip 152 can have a first side having a first peel adhesion value and a second opposing side having a second peel adhesion value that is different than the first peel adhesion value to aid in securing the light guide panel 150 to the housing 110. While the lighting device 100 is shown as including one adhesive strip 152, more generally, the lighting device 100 can include a plurality of adhesive strips that are the same as, or similar to, the adhesive strip 152.

In some implementations, the adhesive strip 152 is a 3M™ Flexographic Plate Mounting Tape or a 3M™ Cushion-Mount™ Printing Tape, which are generally used for mounting flexographic print plates to cylinders or sleeves. Such double-sided tapes are particularly advantageous for coupling the light guide panel 150 to the housing 110, for example, due to their holding power and heat resistance. As one non-limiting example, the adhesive strip 152 can be a 3M™ Cushion-Mount™ Plus Standard Combination Plate Mounting Tape, Product Number E1040H.

The light source 140 is coupled to an inner surface of the second side wall 114B of the housing 110 (e.g., using an adhesive strip that is the same as, or similar to, the adhesive strip 152). While the light source 140 generally emits light in a plurality of directions, a majority of the light is generally emitted towards the first side wall 114A opposite the second side wall 114B. This light enters the light guide panel 150, which generally distributes (e.g., diffuses) the light in a direction that is generally opposite the base 112 of the housing 110 and towards the lens 130. As shown in FIG. 5, the first wing 138A of the lens and the second wing 138B of the lens 130 generally extend from the base 132 of the lens 130 to the light guide panel 150. In other words, the first wing 138A generally extends from the intersection between the first side wall 134A and the base 132 of the lens 130 and the light guide panel 150. Similarly, the second wing 138A generally extends from the intersection between the second side wall 134B and the base 132 of the lens 130 and the light guide panel 150. The first wing 138A and the second wing 138B aid in distributing or diffusing light, thereby aiding in preventing or reducing dark spots at the edges or corners of the lens 130.

In some examples, light emitted from the light source 140 may spill out onto the lens 130 without entering the light guide panel 150 is the light source 140 is not sufficiently aligned with the light guide panel 150. However, even in this case, the first wing 138A and the second wing 138B also aid in diffusing light that spills out from the light source 140 (e.g., aiding in preventing or reducing light hot spots on the lens 130), thereby reducing the required tolerance for the relative positions of the light source 140 and the light guide panel 150.

Referring still to FIG. 5, the lens 130 is coupled to the housing 110 via a snap fit coupling. As described herein, this snap fit coupling allows an installer to couple the lens 130 to the housing 110 after the housing 110 is mounted to an external structure (e.g., a cabinet). To form the snap fit coupling, the first hook 136A of the first side wall 134A of the lens 130 engages the first ridge 118A of the first side wall 114A of the housing 110. Similarly, the second hook 136B of the second side wall 134B of the lens 130 engages the second ridge 118B of the second side wall 114B of the housing 110. As shown in FIG. 5, a portion of the first side wall 114A and a portion of the second side wall 114B are disposed within the internal cavity 133 of the lens 130. In other words, a portion of the lens 130 surrounds a portion of the housing 110 so that the portion of the housing 110 is not visible from outside of the lens 130.

While the lighting device 100 is shown as including one light source 140, in some implementations, the lighting device 100 includes a plurality of light sources that are the same as, or similar to, the light source 140. In such implementations, a first one of the light sources can be coupled to the inner surface of the first side wall 114A and a second one of the light sources can be coupled to the inner surface of the second side wall 114B. The light first light source can emit a first wavelength of light (e.g., white light) and the second light source can emit a second wavelength of light or a plurality of wavelengths of light (e.g., red light, blue light, green light, etc.). The plurality of light sources can be tuned or adjusted to create a white or warm dim effect that avoids the pink effect that is visible when the color delta is greater than 2000K and the dimming curve no longer follows the black body dimming curve.

Figure 6A:
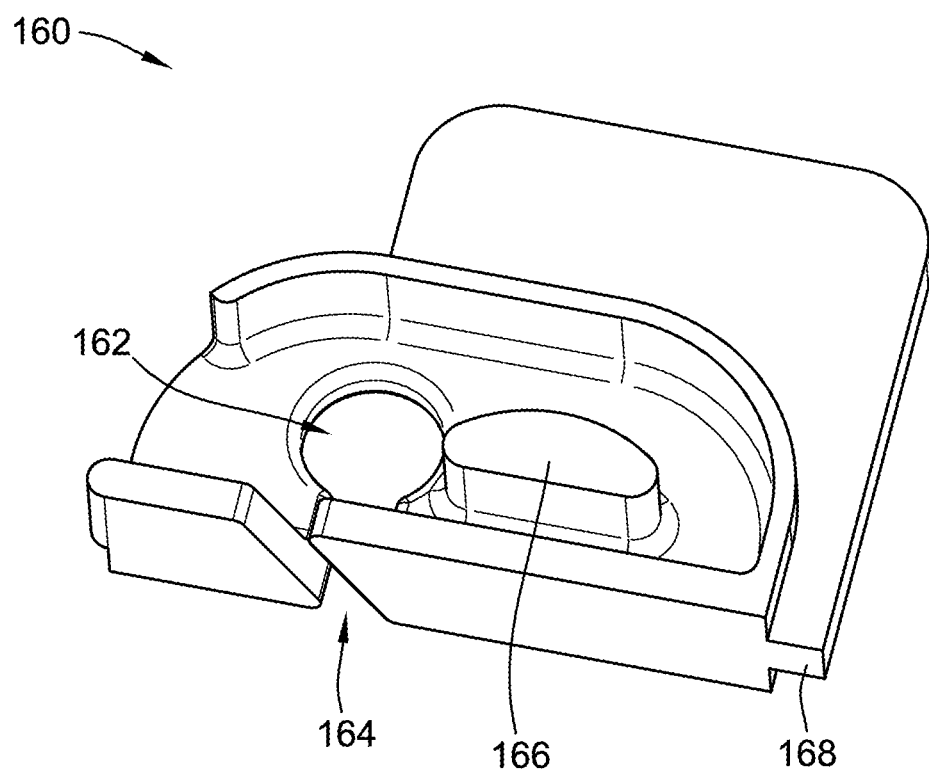
FIG. 6A is a perspective view of a wiring guide of the lighting device of FIG. 1A, according to some implementations of the present disclosure.
Figure 6B:
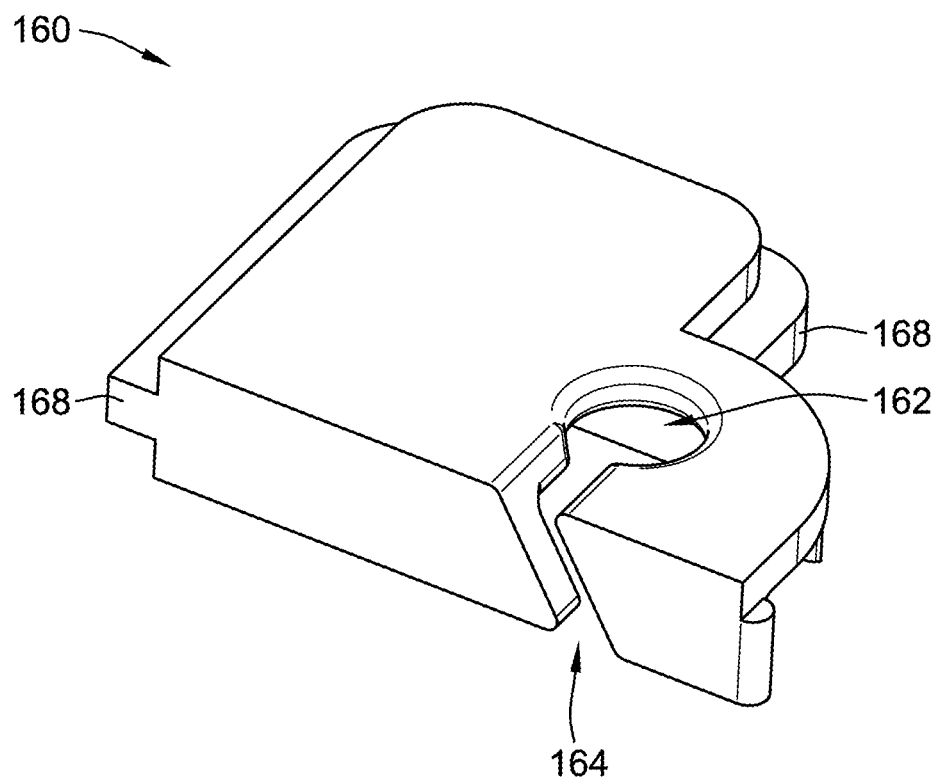
FIG. 6B is a perspective view of a wiring guide of the lighting device of FIG. 1A, according to some implementations of the present disclosure

Referring to FIGS. 6A and 6B, the wiring guide 160 is generally used to guide the power cable 172 through the housing 110 so that the connector 170 can be coupled to (e.g., directly or indirectly) a power supply (e.g., an AC electrical outlet). The wiring guide 160 includes an aperture 162, a slot 164, a protrusion 166, and a tongue 168. The aperture 162 and slot 164 are sized and shaped to allow at least a portion of the power cable 172 to pass through. The protrusion 166 extends from a lower surface of the wiring guide 160 so that a portion of the power cable 172 can be wrapped around the protrusion 166 to aid in keeping the power cable 172 in place. The tongue 168 is sized and shaped to engage the groove 124 of the housing 110 (FIGS. 2A-2B) so that the wiring guide 160 can be coupled to the cutout 128 (FIG. 2B) of the housing 110, as shown in FIG. 1A. As discussed herein, in some implementations, the lighting device 100 includes a plurality of light sources (e.g., one coupled to the first side wall 120A and a second coupled to the second side wall 120B). In such implementations, the wiring guide 160 can include one or more additional apertures so that the wiring for both light sources can be received within and fed through the wiring guide 160. While the wiring guide 160 is shown as including one tongue 168, in other implementations, the wiring guide 160 can additionally include a second tongue that is received within a groove (e.g., like the groove 124) of another lighting device that is the same as, or similar to, the lighting device 100. This aids in coupling the lighting device and the other lighting device as well as aligning the two lighting devices.

Referring back to FIGS. 1A and 1B, the ends of the lighting device 100 are generally straight (e.g., the housing 110 and the lens 130 have a generally rectangular profile). However, in some implementations, the lighting device 100 can include one or more mitered ends. In such implementations, the mitered end(s) appear as if cut at an angle that is, for example, between about 30 degrees and about 80 degrees (e.g., 45 degrees, 60 degrees, 75 degrees, etc.). A first lighting device with a mitered end can be positioned to abut another lighting device with a mitered end to form a miter joint such that a longitudinal axis of the first lighting device is at angle (e.g., 90 degrees) relative to a longitudinal axis of the second lighting device. In such implementations, the light source 140 is positioned on the longer edge of the housing 110. The light guide panel 150 is additionally advantageous in such implementations to prevent or reduce the appearance of a dark line or edge at the miter joint between the two lighting devices.

Figure 7:
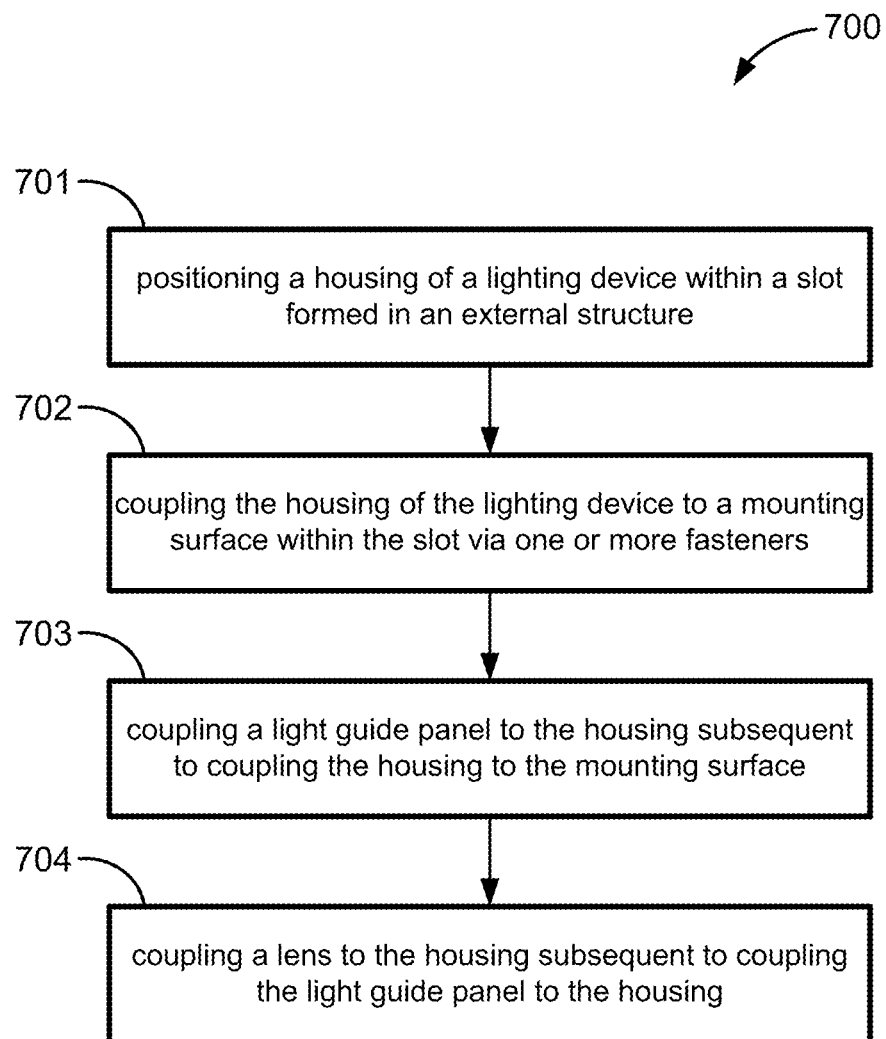
FIG. 7 is a process flow diagram for a method for installing one or more lighting devices, according to some implementations of the present disclosure.

Referring to FIG. 7, a method 700 for installing a light device according to some implementations of the present disclosure is illustrated. The method 700 can be performed using, for example, the lighting device 100 described herein.

Step 701 of the method 700 includes positioning a housing of a lighting device within a slot formed in an external structure. The external structure can be, for example, a cabinet or other furniture. Referring to FIG. 8A, an external structure 800 includes millwork portion 802, millwork portion 804, blocking false bottom portion 806, and blocking false bottom portion 808. The external structure 800 also includes a slot 820 formed between the millwork portion 802 and millwork portion 804 and an opening 822 between the blocking false bottom portion 806 and the blocking false bottom portion 808. The slot 820 can be a generally rectangular slot formed in the external structure having a width of, for example, about 1.75 inches. The blocking false bottom portion 806 includes a mounting surface 810 to which the lighting device 100 is mounted.

The lighting device 100 can be positioned within the slot 820 as shown in FIG. 8B. As described herein, the first bumper 120A and/or the second bumper 120B are moveable or deflectable relative to the base 112 of the housing 110 to aid in positioning the housing 110 within the slot 120. Similarly, in some implementations, the first side wall 114A and/or the second side wall 114B are moveable or deflectable relative to the base 112 to further aid in positioning the housing 110 within the slot 120. If the housing 110 has a width of about 1.75 inches and the slot 820 has a width of about 1.75, this movement or deflection of portions of the housing 110 allow the housing 110 to be received and secured within the slot 820 even if the spacing or tolerance for the slot 820 is inaccurate. This is particularly advantageous in field constructions where the slot 820 is formed in the field (e.g., not in the factory where the external structure 800 is made) and where the lighting device 100 is attached is the field.

In some implementations, step 701 includes marking a location for the opening 822 based on the position of the power cable 172 when the housing 110 is positioned within the slot 820 and forming (e.g., drilling) the opening 822 between the blocking false bottom portion 806 and the blocking false bottom portion 808. While the opening 822 is shown to the right of the fastener 180 in FIG. 8B, more generally, the opening 822 can be formed at any suitable location relative to the housing 110 and fastener 180 (e.g., to the left of the fastener 180 shown in FIG. 8B).

Step 702 of the method 700 includes coupling the housing of the lighting device to a mounting surface within the slot via one or more fasteners. For example, referring to FIG. 8B, the housing 110 is coupled to the mounting surface 810 via the fastener 180 (e.g., a threaded screw), which extends through the housing 110 and engages the blocking false bottom portion 808 to aid in securing the housing 110 within the slot 820. As shown, during step 702, the light source 140 is coupled to the housing 110, but the lens 130 and the light guide panel 150 and are not. In some implementations, step 702 includes drilling one or more apertures in the base 112 of the housing 110 and/or through the mounting surface 810 for receiving the one or more fasteners therein. For example, step 702 can include drilling a plurality of apertures along the scribed line 129 (FIG. 2A) of the base 112 of the housing 110 and corresponding apertures through the mounting surface 810. In this example, the drilling of the apertures can be performed while the housing 110 is positioned within the slot 820 generally as shown in FIG. 8B.

Step 703 of the method 700 includes coupling a light guide panel to the housing subsequent to coupling the housing to the mounting surface. For example, step 702 can include coupling one or more adhesive strips to the housing. The adhesive strips can be reusable (e.g., attached to one location on the housing, removed, then attached to another location on the housing). Referring to FIG. 8B, the adhesive strip 152 is adhered to the housing 110. Then, the light guide panel 150 is adhered to the housing 110 via the adhesive strip 152. In some implementations, the light guide panel 150 includes a clear edge and a silver tape edge. In such implementations, step 703 includes pushing the clear edge of the light guide panel 150 against the light source 140 at an angle, centering the light guide panel 150 along light source 140, and then rotating the light guide panel 150 relative to the housing 110 and pushing towards the adhesive strip 152.

Step 704 of the method 700 includes coupling a lens to the housing subsequent to coupling the light guide panel to the housing. For example, referring to FIG. 8D, the lens 130 is coupled to the housing 110. As described herein, the first hook 136A of the first side wall 134A of the lens 130 engages the first ledge 118A of the first side wall 114A of the housing 110 and the second hook 136B of the second side wall 134B of the lens 130 engages the second ledge 118B of the second side wall 114B of the housing 110 to form a snap fit coupling. In some implementations, step 704 includes cutting the lens 130 so that the length of the lens 130 is substantially equal to the length of the housing 110. In some cases, the millwork portion 802 and/or millwork portion 804 may be moved after the housing 110 has been installed; however, the first bumper 122A and second bumper 122A prevent the housing 110 from being compressed and ensure sufficient spacing between the edges of the millwork portion 802 and/or millwork portion 804 so that the lens 130 can be snap fit onto the housing 110.

As shown in FIG. 8D, the surface of the lens 130 is generally flush with the bottom surface of the millwork portion 802 and millwork portion 804. In some implementations, the first side wall 134A of the lens 130 can be spaced from the millwork portion 802 and the second side wall 134A of the lens 130 can be spaced from the millwork portion 804 by about 0.0625 inches. Advantageously, the housing 110 will not be visible when the lens 130 is installed because the first side wall 134A and the second side wall 134B of the lens 130 surround at least a portion of the first side wall 114A and second side wall 114B of the housing 110. This eliminates the need to include flanges or an edge of the lighting device that have the same color and/or finish (e.g., nature, white, black, etc.) as the millwork portions 802 and 804, providing a uniform appearance without mismatched trim.

One or more elements or aspects or steps, or any portion(s) thereof, from one or more of any of the claims below can be combined with one or more elements or aspects or steps, or any portion(s) thereof, from one or more of any of the other claims or combinations thereof, to form one or more additional implementations and/or claims of the present disclosure.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A lighting device comprising:
a housing including a base, a first side wall, a second side wall, the housing being configured to be positioned within a slot formed in an external structure;
a light source coupled to the housing;
a light guide panel coupled to the housing and configured to diffuse light emitted by the light source; and
a lens including a base, a first side wall, a second side wall, a first wing protruding from an inner surface of the first side wall, and a second wing protruding from an inner surface of the second side wall, the lens being coupled to the housing such that a portion of the first side wall of the housing and a portion of the second side wall of the housing are positioned between the first side wall of the lens and the second side wall of the lens.

2. The lighting device of claim 1, wherein the first wing and the second wing of the lens are configured to aid in distributing light emitted by the light source.

3. The lighting device of claim 2, wherein the first wing of the lens extends between the first side wall of the lens and a surface of the light guide panel.

4. The lighting device of claim 3, wherein the second wing of the lens extends between the second side wall of the lens and the surface of the light guide panel.

5. The lighting device of claim 1, wherein the first wing has a first radius curvature and the second wing has a second radius of curvature.

6. The lighting device of claim 5, wherein the first radius of curvature is the same as the second radius of curvature.

7. The lighting device of claim 1, wherein the first side wall of the lens is coupled to the first side wall of the housing via a snap fit connection.

8. The lighting device of claim 1, further comprising a second light source coupled to the housing, wherein the light source is coupled to an inner surface of the first side wall of the housing and the second light source is coupled to an inner surface of the second side wall of the housing.

9. The lighting device of claim 1, further comprising a power cable configured to electrically couple the light source to a power supply and a wiring guide coupled to the housing, the wiring guide including aperture for receiving a portion of the power cable therein.

10. The lighting device of claim 1, wherein the housing further includes a groove formed in the base and the wiring guide includes a tongue configured to engage the groove to aid in coupling the wiring guide to the housing.

11. A system comprising:
a plurality of lighting devices, each of the plurality of lighting devices including:
a housing including a base, a first side wall, a second side wall, the housing being configured to be positioned within a slot formed in an external structure;
a light source coupled to the housing;
a light guide panel coupled to the housing and configured to diffuse light emitted by the light source; and
a lens including a base, a first side wall, a second side wall, a first wing protruding from an inner surface of the first side wall, and a second wing protruding from an inner surface of the second side wall, the lens being coupled to the housing such that a portion of the first side wall of the housing and a portion of the second side wall of the housing are positioned between the first side wall of the lens and the second side wall of the lens.

12. The system of claim 11, wherein the plurality of lighting devices includes (i) a first lighting device having a first end and second end and (ii) a second lighting device having a first end and a second end, wherein the first end of the first lighting device and the first end of the second lighting device have a first miter angle and the first end of the first lighting device abuts the first end of the second lighting device to form a miter joint.

13. The system of claim 1, wherein the housing includes a first bumper protruding from an outer surface of the first side wall.

14. The system of claim 13, wherein the housing includes a second bumper protruding from an outer surface of the second side wall.

15. The system of claim 14, wherein the first bumper and the second bumper are configured to aid in positioning the housing within the slot.

\* \* \* \* \*